(12) United States Patent
Wang

(10) Patent No.: US 8,850,693 B2
(45) Date of Patent: Oct. 7, 2014

(54) ASSEMBLY TOOL FOR ASSEMBLING OPTICAL LENS

(75) Inventor: Chien-Chun Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/430,819

(22) Filed: Mar. 27, 2012

(65) Prior Publication Data

US 2013/0086802 A1    Apr. 11, 2013

(30) Foreign Application Priority Data

Oct. 6, 2011    (TW) .................................. 100136185

(51) Int. Cl.
*B23P 19/04* (2006.01)
*B23Q 17/22* (2006.01)
*G02B 7/02* (2006.01)

(52) U.S. Cl.
CPC ...................................... *G02B 7/023* (2013.01)
USPC ..... 29/721; 29/407.01; 29/407.05; 29/407.09

(58) Field of Classification Search
CPC .......... B23P 19/00; B23P 19/04; B23P 11/00; H05K 13/0413
USPC ................... 29/25.35, 407.1, 407.01, 407.05, 29/407.09, 464, 700, 721, 729, 739, 740, 29/832

See application file for complete search history.

(56) References Cited

U.S. PATENT DOCUMENTS

2010/0039713 A1*   2/2010   Lusinchi et al. .............. 359/819

* cited by examiner

*Primary Examiner* — Alexander P Taousakis
*Assistant Examiner* — Lee A Holly
(74) *Attorney, Agent, or Firm* — Novak Druce Connolly Bove + Quigg LLP

(57) ABSTRACT

An assembly tool for assembling a lens tube in a lens base includes a support base, a fastening unit, a first height sensor, and a second height sensor. The support base defines a positioning groove for receiving the lens base. The fastening unit includes a fastening pole and a torque meter connected to an end of the fastening pole. The fastening pole forms a plurality of connecting portions for engaging with the lens tube. The first height sensor is positioned on the support base to detect a height of the lens base. The second height sensor is positioned on the support base to detect a height of an optical lens formed by the lens tube and the lens base.

7 Claims, 1 Drawing Sheet

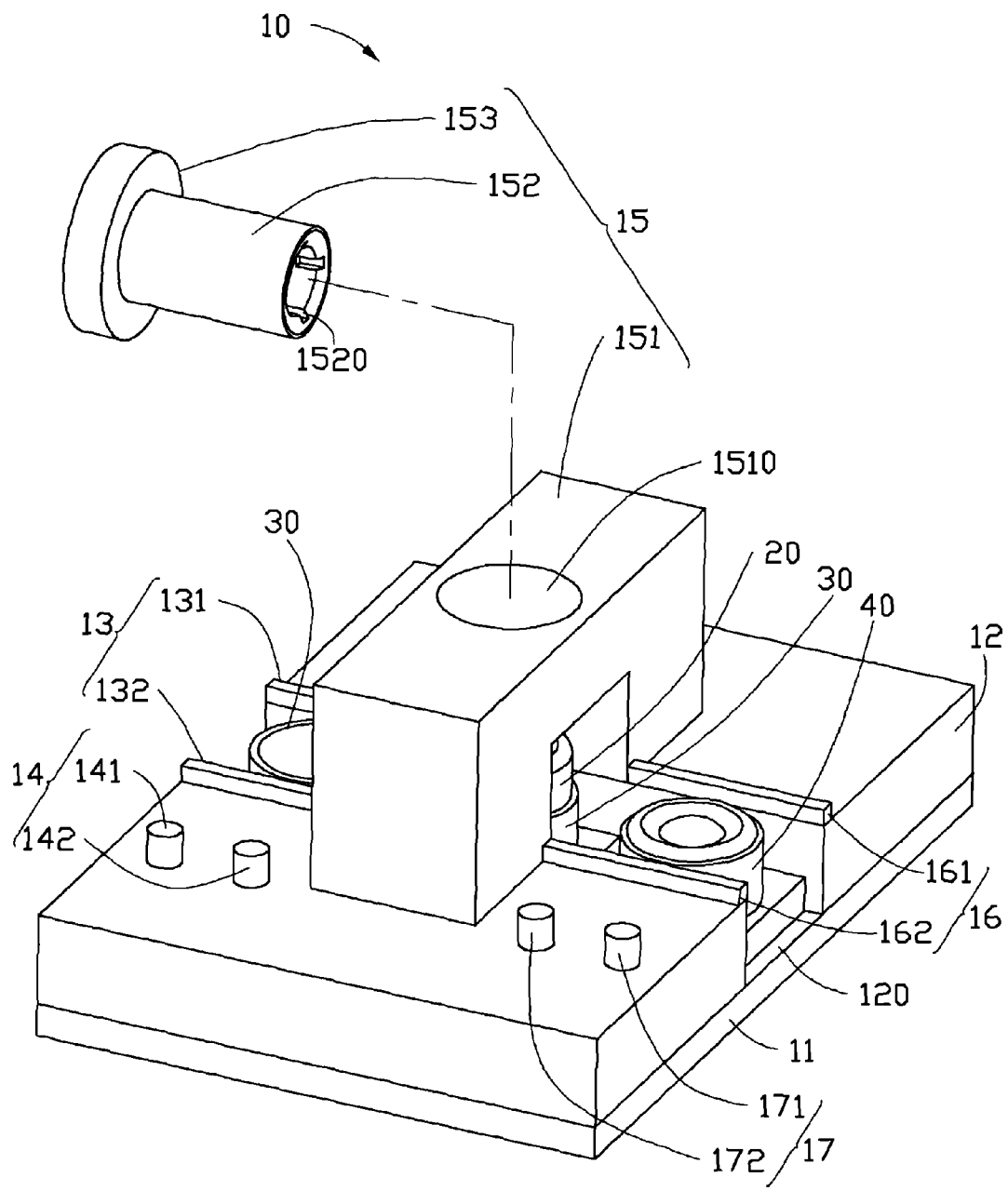

ASSEMBLY TOOL FOR ASSEMBLING OPTICAL LENS

BACKGROUND

1. Technical Field

The present disclosure generally relates to assembly tools, and particularly to an assembly tool for assembling an optical lens.

2. Description of the Related Art

In assembly of an optical lens for a mobile phone, a group of lenses is inserted into a lens tube, and an IR filter is attached to the lens tube. After that, glue is dispensed between the IR filter and the lens tube. Next, the lens tube is fixed in an assembly base, and the optical lens is assembled. However, an operator generally places the lens tube in the assembly base manually, therefore, the optical lens may easily be scratched and contaminated.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

The FIGURE is an isometric view of an embodiment of an assembly tool for assembling a lens tube in a lens base.

DETAILED DESCRIPTION

The FIGURE, is an embodiment of an assembly tool 10 for assembling a lens tube 20 in a lens base 30 to form an optical lens 40. The assembly tool 10 includes a bottom plate 11, a support base 12, a first height sensor 13, a first display unit 14, a fastening unit 15, a second height sensor 16, and a second display unit 17.

The support base 12 is positioned on the bottom plate 11, and defines a positioning groove 120. The lens base 30 can be transferred from an end of the positioning groove 120 to the other end of the positioning groove 120. A depth of the positioning groove 120 is substantially equal to a height of the lens base 30.

The first height sensor 13 and the second height sensor 16 are positioned on opposite ends of sidewalls of the positioning groove 120. The first height sensor 13 is used for detecting a height of the lens base 30, and the second height sensor 16 is used for detecting a height of the optical lens 40 formed by the lens base 30 and the lens tube 20.

The first height sensor 13 includes a first transmitter 131 and a first receiver 132. The first transmitter 131 and the first receiver 132 are positioned on opposite sidewalls of the positioning groove 120, and thus the first receiver 132 can receive an optical signal sent by the first transmitter 131.

The second height sensor 16 includes a second transmitter 161 and a second receiver 162. The second transmitter 161 and the second receiver 162 are positioned on opposite sidewalls of the positioning groove 120, and thus the second receiver 162 can receive an optical signal sent by the second transmitter 161.

The fastening unit 15 includes a support frame 151, a fastening pole 152, and a torque meter 153. The support frame 151 is positioned on the support base 12, and across the positioning groove 120. The torque meter 153 is used for detecting a combination force between the lens base 30 and the lens tube 20, when the lens tube 20 is assembled in the lens base 30.

The support frame 151 defines a penetrating hole 1510 opposite to the positioning groove 120. The fastening pole 152 is slidably positioned in the penetrating hole 1510. The fastening pole 152 forms a plurality of connecting portions 1520 in an end thereof. In the illustrated embodiment, the fastening pole 152 is hollow, and the plurality of connecting portions 1520 are connecting grooves defined in the inner surface of the fastening pole 152. The lens tube 20 can partially engage with the plurality of connecting portions 1520 of the fastening pole 152, therefore, the fastening pole 152 can rotate together with the lens tube 20.

The first display unit 14 is connected to the first height sensor 13 to display the detecting result of the first height sensor 13. The first display unit 14 includes a first green diode 141 and a first red diode 142. When the first receiver 132 receives the optical signal sent by the first transmitter 131, the first green diode 141 emits light to indicate the lens base 30 meets the height demand. When the first receiver 132 cannot receive the optical signal sent by the first transmitter 131, the first red diode 142 emits light to indicate that a height of the lens base 30 is larger than the demanded height.

The second display unit 17 is connected to the second height sensor 16 to display the detecting result of the second height sensor 16. The second display unit 17 includes a second green diode 171 and a second red diode 172. When the second receiver 162 receives the optical signal sent by the second transmitter 161, the second green diode 171 emits light to indicate the optical lens 40 meets the height demand. When the second receiver 162 cannot receive the optical signal sent by the second transmitter 161, the second red diode 172 emits light to indicate that a height of the optical lens 40 is larger than the demanded height.

In use, the lens base 30 is positioned in the positioning groove 120, and the first height sensor 13 is turned on. The first transmitter 131 emits the optical signal. If the first green diode 141 emits light, the lens base 30 meets the height demand. If the first red diode 142 emits light, the height of the lens base 30 is larger than the demanded height. Therefore, when the first red diode 142 emits light, the detected lens base 30 should be taken out of the positioning groove 120, and then another lens base 30 is positioned in the positioning groove 120. When the first green diode 141 emits light, the detected lens base 30 is moved along the positioning groove 120 until the lens base 30 is aligned with the penetrating hole 1510. The plurality of connecting portions 1520 of the fastening pole 152 engage with the lens tube 20, and then the fastening pole 152 extends through the penetrating hole 1510 of the fastening pole 152, such that the lens tube 20 is aligned with the lens base 30.

The torque meter 153 is rotated together with the fastening pole 152, such that the lens tube 20 is gradually inserted into the lens base 30. When the torque meter 153 shows a torque value in a predetermined torque range, the fastening pole 152 moves upwards, in order to separate the fastening pole 152 and the lens tube 20. After that, the lens base 30 together with the lens tube 20 move to a side of the support frame 151 adjacent to the second height sensor 16.

When the lens base 30 together with the lens tube 20 move between the second receiver 162 and the second transmitter 161, the second height sensor 16 turns on. The second transmitter 161 emits the optical signal. When the second red diode 172 emits light, it is indicated that the height of the optical lens 40 formed by the lens base 30 and lens tube 20 is larger than the demanded height. As a result, the optical lens 40 should be repositioned under the support frame 151, and the lens tube 20 is further inserted into the lens base 30 driven by the fastening pole 152, until the optical lens 40 meets the height demand. When the second green diode 171 emits light, the optical lens 40 meets the height demand, and thus the optical lens 40 can be taken out of the positioning groove 120 of the support base 12.

The assembly tool 10 use the first height sensor 13 to distinguish the lens base 30 meets the height demand, and use the second height sensor 16 to distinguish the optical lens 40 meets the height demand An operator can easily get the height detecting results by watching the first display unit 14 and the second display unit 17. Furthermore, the operator would not touch the lens tube 20, and thus the lens tube 20 cannot be scratched and contaminated. Moreover, a combination force between the lens base 30 and the lens tube 20 may easily be detected by the torque meter 153.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An optical lens assembly tool for assembling a lens tube in a lens base, comprising:
    a support base defining a positioning groove for receiving the lens base;
    a fastening unit comprising a fastening pole and a torque meter connected to an end of the fastening pole, the fastening pole comprising at least one connecting portion for engaging with the lens tube; and
    a height sensor positioned on the support base, the height sensor being adapted to detect a height of an optical lens formed by the lens tube and the lens base.

2. The optical lens assembly tool of claim 1, wherein the fastening unit further comprises a support frame positioned on the support base and across the positioning groove, the fastening pole is positioned on the support frame.

3. The optical lens assembly tool of claim 2, wherein the support frame defines a penetrating hole opposite to the positioning groove, and the fastening pole extends through the penetrating hole of the support frame.

4. The optical lens assembly tool of claim 1, wherein the height sensor comprises a transmitter and a receiver, the transmitter and the receiver are positioned on opposite sidewalls of the positioning groove.

5. The optical lens assembly tool of claim 4, further comprising a display unit connected to the height sensor, the display unit is adapted to display detecting results of the height sensor.

6. The optical lens assembly tool of claim 5, wherein the display unit comprises a green diode and a red diode; when the receiver receives an optical signal sent by the transmitter, the green diode emits light; when the receiver does not receive the optical signal sent by the second transmitter, the red diode emits light.

7. The optical lens assembly tool of claim 1, wherein the fastening pole is hollow, and the at least one connecting portion defines at least one connecting groove on an inner surface of the fastening pole.

\* \* \* \* \*